United States Patent
Lu et al.

(10) Patent No.: US 9,531,003 B2
(45) Date of Patent: Dec. 27, 2016

(54) SODIUM IRON(II)-HEXACYANOFERRATE(II) BATTERY ELECTRODE

(71) Applicant: Sharp Laboratories of America, Inc., Camas, WA (US)

(72) Inventors: Yuhao Lu, Vancouver, WA (US); Sean Andrew Vail, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 15/218,508

(22) Filed: Jul. 25, 2016

(65) Prior Publication Data

US 2016/0336588 A1 Nov. 17, 2016

Related U.S. Application Data

(60) Division of application No. 14/067,038, filed on Oct. 30, 2013, which is a continuation-in-part of (Continued)

(51) Int. Cl.
*H01M 4/36* (2006.01)
*H01M 4/136* (2010.01)
(Continued)

(52) U.S. Cl.
CPC ............ *H01M 4/136* (2013.01); *H01M 2/14* (2013.01); *H01M 4/049* (2013.01); (Continued)

(58) Field of Classification Search
CPC ........ H01M 4/58; H01M 4/04; H01M 5/5825; H01M 2/1653; H01M 2/1686; H01M 4/628; H01M 7/042; H01M 4/133; H01M 4/136; Y10T 29/49108; C01D 15/02; C01D 1/02; C01B 33/021; C01B 31/00; C01B 25/003; C01B 18/02
See application file for complete search history.

(56) References Cited

U.S. PATENT DOCUMENTS 4,029,012 A * 6/1977 Smith, III ............ A61B 5/1172
101/368

OTHER PUBLICATIONS

V. D. Neff, "Some Performance Characteristics of a Prussian Blue Battery", Journal of Electrochemical Society 1985, 132, 1382-1384.
(Continued)

*Primary Examiner* — Emily Le
*Assistant Examiner* — Monique Wills
(74) *Attorney, Agent, or Firm* — Law Office of Gerald Maliszewski; Gerald Maliszewski

(57) ABSTRACT

A method is provided for synthesizing sodium iron(II)-hexacyanoferrate(II). A $Fe(CN)_6$ material is mixed with the first solution and either an anti-oxidant or a reducing agent. The $Fe(CN)_6$ material may be either ferrocyanide ($[Fe(CN)_6]^{4-}$) or ferricyanide ($[Fe(CN)_6]^{3-}$). As a result, sodium iron(II)-hexacyanoferrate(II) ($Na_{1+X}Fe[Fe(CN)_6]_Z \cdot MH_2O$ is formed, where X is less than or equal to 1, and where M is in a range between 0 and 7. In one aspect, the first solution including includes A ions, such as alkali metal ions, alkaline earth metal ions, or combinations thereof, resulting in the formation of $Na_{1+X}A_YFe[Fe(CN)_6]_Z \cdot MH_2O$, where Y is less than or equal to 1. Also provided are a $Na_{1+X}Fe[Fe(CN)_6]_Z \cdot MH_2O$ battery and $Na_{1+X}Fe[Fe(CN)_6]_Z \cdot MH_2O$ battery electrode.

6 Claims, 6 Drawing Sheets

Related U.S. Application Data application No. 14/059,599, filed on Oct. 22, 2013, now Pat. No. 9,083,041, which is a continuation-in-part of application No. 13/907,892, filed on Jun. 1, 2013, now Pat. No. 8,968,925, which is a continuation-in-part of application No. 13/897,492, filed on May 20, 2013, now Pat. No. 9,099,719, which is a continuation-in-part of application No. 13/872,673, filed on Apr. 29, 2013, now Pat. No. 9,246,164, which is a continuation-in-part of application No. 13/752,930, filed on Jan. 29, 2013, now Pat. No. 9,099,718, which is a continuation-in-part of application No. 13/603,322, filed on Sep. 4, 2012, now Pat. No. 9,159,502, which is a continuation-in-part of application No. 13/523,694, filed on Jun. 14, 2012, now Pat. No. 8,956,760, which is a continuation-in-part of application No. 13/449,195, filed on Apr. 17, 2012, which is a continuation-in-part of application No. 13/432,993, filed on Mar. 28, 2012, now Pat. No. 9,269,953.

(51) Int. Cl.
 H01M 10/056 (2010.01)
 H01M 2/14 (2006.01)
 H01M 4/04 (2006.01)
 H01M 4/58 (2010.01)
 H01M 4/1397 (2010.01)

(52) U.S. Cl.
 CPC ....... *H01M 4/0471* (2013.01); *H01M 4/1397* (2013.01); *H01M 4/58* (2013.01); *H01M 10/056* (2013.01)

(56) References Cited

OTHER PUBLICATIONS

N. Imanishi et al., "Lithium Intercalation Behavior into Iron Cyanide Complex as Positive Electrode of Lithium Secondary Battery", Journal of Power Sources 1999, 79, 215-219.

Y. Lu, L. Wang, J. Cheng, and J. B. Goodenough, "Prussian Blue: a New Framework for Sodium Batteries", Chemistry Communications 2012, 48, 6544-6546.

L. Wang et al., "A Superior Low-Cost Cathode for a Na-ion Battery", Angewandte Chemie International Edition 2013, 52, 1964-1967.

A. Eftekhari, "Potassium Secondary Cell Based on Prussian Blue Cathode", Journal of Power Sources 2004, 126, 221-228.

C. D. Wessells et al., "Copper Hexacyanoferrate Battery Electrodes with Long Cycle Life and High Power", Nature Communications 2011, 2, Article No. 550.

C. D. Wessells et al., "Nickel Hexacyanoferrate Nanoparticle Electrodes for Aqueous Sodium and Potassium Ion Batteries", Nano Letters 2011, 11, 5421-5425.

C. D. Wessells et al., "The Effect of Insertion Species on Nanostructured Open Framework . . . ", Journal of the Electrochemical Society 2012, 159, A98-A103.

T. Matsuda, M. Takachi, and Y. Moritomo, "A Sodium Manganese Ferrocyanide Thin Film for Na-ion Batteries", Chemical Communications 2013, 49, 2750-2752.

S-H. Yu et al., "Iron Hexacyanoferrate Nanoparticles as Cathode Materials for Lithium and Sodium Rechargeable Batteries", ECS Electrochemistry Letters 2013, 2, A39-A41.

M. Hu and J. S. Jiang, "Facile Synthesis of Air-Stable Prussian White Microcubes via a Hydrothermal Method", Materials Research Bulletin 2011, 46, 702-707.

S-H. Lee and Y-D. Huh, "Preferential Evolution of Prussian Blue's Morphology from Cube to Hexapod", The Bulletin of the Korean Chemical Society 2012, 33, 1078-1080.

M. Hu, J-S. Jiang, C-C. Lin, and Y. Zeng, "Prussian Blue Mesocrystals: an Example of Self-Construction", CrystEngComm 2010, 12, 2679-2683.

M. Hu, R-P. Ji, and J-S. Jiang, "Hydrothermal Synthesis of Magnetite Crystals: from Sheet to Pseudo-Octahedron", Materials Research Bulletin 2010, 45, 1811-1715.

\* cited by examiner

BATTERY 400

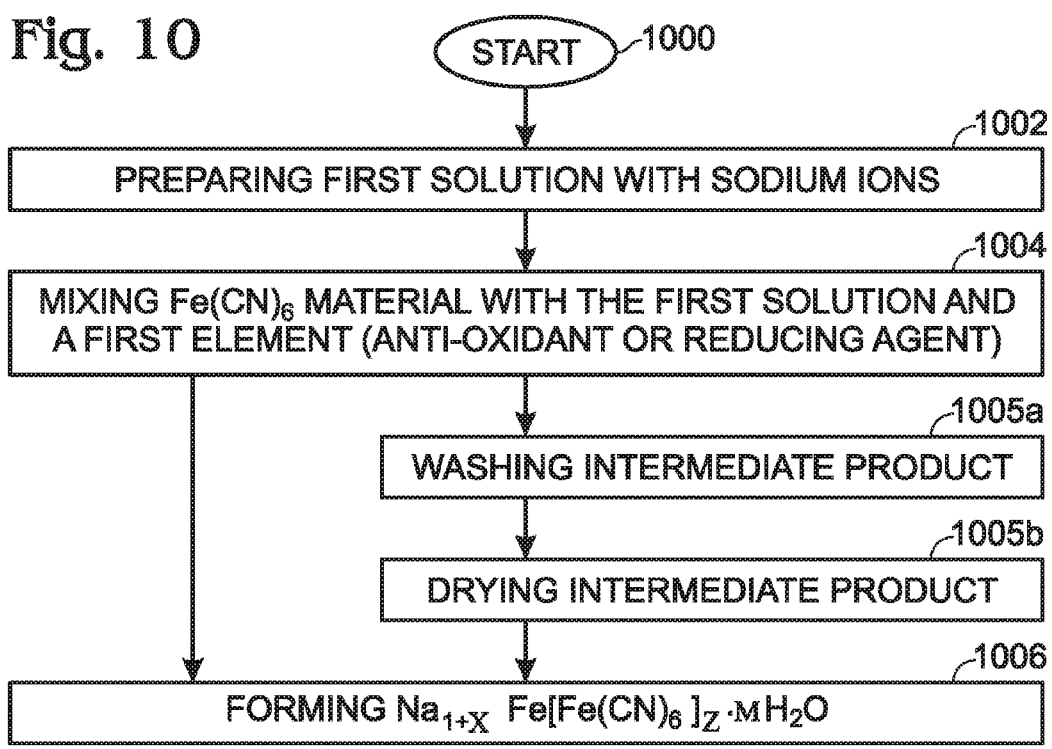

US 9,531,003 B2

SODIUM IRON(II)-HEXACYANOFERRATE(II) BATTERY ELECTRODE

RELATED APPLICATIONS

This application is a Divisional of an application entitled, SODIUM IRON(II)-HEXACYANOFERRATE(II) BATTERY ELECTRODE AND SYNTHESIS METHOD, invented by Yuhao Lu et al., Ser. No. 14/067,038, filed Oct. 30, 2013;

which is a Continuation-in-Part of an application entitled, TRANSITION METAL HEXACYANOMETALLATE-CONDUCTIVE POLYMER COMPOSITE, invented by Sean Vail et al., Ser. No. 14/059,599, filed Oct. 22, 2013;

which is a Continuation-in-Part of an application entitled, METAL-DOPED TRANSITION METAL HEXACYANOFERRATE (TMHCF) BATTERY ELECTRODE, invented by Yuhao Lu et al., Ser. No. 13/907,892, filed Jun. 1, 2013;

which is a Continuation-in-Part of an application entitled, HEXACYANOFERRATE BATTERY ELECTRODE MODIFIED WITH FERROCYANIDES OR FERRICYANIDES, invented by Yuhao Lu et al., Ser. No. 13/897,492, filed May 20, 2013;

which is a Continuation-in-Part of an application entitled, PROTECTED TRANSITION METAL HEXACYANOFERRATE BATTERY ELECTRODE, invented by Yuhao Lu et al., Ser. No. 13/872,673, filed Apr. 29, 2013;

which is a Continuation-in-Part of an application entitled, TRANSITION METAL HEXACYANOFERRATE BATTERY CATHODE WITH SINGLE PLATEAU CHARGE/DISCHARGE CURVE, invented by Yuhao Lu et al., Ser. No. 13/752,930, filed Jan. 29, 2013;

which is a Continuation-in-Part of an application entitled, SUPERCAPACITOR WITH HEXACYANOMETALLATE CATHODE, ACTIVATED CARBON ANODE, AND AQUEOUS ELECTROLYTE, invented by Yuhao Lu et al., Ser. No. 13/603,322, filed Sep. 4, 2012.

Ser. No. 13/752,930 is also a Continuation-in-Part of an application entitled, IMPROVEMENT OF ELECTRON TRANSPORT IN HEXACYANOMETALLATE ELECTRODE FOR ELECTROCHEMICAL APPLICATIONS, invented by Yuhao Lu et al., Ser. No. 13/523,694, filed Jun. 14, 2012;

which is a Continuation-in-Part of an application entitled, ALKALI AND ALKALINE-EARTH ION BATTERIES WITH HEXACYANOMETALLATE CATHODE AND NON-METAL ANODE, invented by Yuhao Lu et al., Ser. No. 13/449,195, filed Apr. 17, 2012;

which is a Continuation-in-Part of an application entitled, ELECTRODE FORMING PROCESS FOR METAL-ION BATTERY WITH HEXACYANOMETALLATE ELECTRODE, invented by Yuhao Lu et al., Ser. No. 13/432,993, filed Mar. 28, 2012. All these applications are incorporated herein by reference.

This invention was made with Government support under DE-AR0000297 awarded by DOE. The Government has certain rights in this invention.

BACKGROUND OF THE INVENTION

1. Field of the Invention

This invention generally relates to electrochemical cells and, more particularly, to a sodium iron(II)-hexacyanoferrate(II) material, iron(II)-hexacyanoferrate(II) battery electrode, and associated fabrication processes.

2. Description of the Related Art

A battery is an electrochemical cell through which chemical energy and electric energy can be converted back and forth. Overall, the energy density of a battery is determined by its voltage and charge capacity. Lithium has the most negative potential (−3.04 V vs. $H_2/H^+$), and exhibits the highest gravimetric capacity corresponding to 3860 milliamp-hours per gram (mAh/g). Due to their high energy densities, lithium-ion batteries (LIBs) have triggered the portable electronics revolution. However both the high cost of lithium metal and the strain on natural resources render doubtful the commercialization of LIBs as large scale energy storage devices. In general, LIBs employ lithium storage compounds as the positive (cathode) and negative (anode) electrode materials. During battery cycling, lithium ions ($Li^+$) are exchanged between the positive and negative electrodes. LIBs have been referred to as "rocking chair" batteries since the lithium ions "rock" (shuttle) back and forth between the positive and negative electrodes as the cells are charged and discharged. The positive electrode (cathode) material is conventionally a metal oxide with a layered structure, such as lithium cobalt oxide ($LiCoO_2$), or a material having a tunneled structure, such as lithium manganese oxide ($LiMn_2O_4$), on an aluminum current collector. The negative electrode (anode) typically consists of graphitic carbon, also a layered material, on a copper current collector. During the charge-discharge process, lithium ions are inserted into, or extracted from, the interstitial spaces of the active materials.

Analogous to LIBs, metal-ion batteries employ metal-ion host compounds as their electrode materials into which metal-ions can migrate both easily and reversibly. Since $Li^+$ has one of the smallest radii among metal ions, it is easily accommodated within the interstitial spaces of various materials including layered $LiCoO_2$, olivine-structured $LiFePO_4$, spinel-structured $LiMn_2O_4$, and so on. In contrast, larger metal ions such as sodium ions ($Na^+$), potassium ions ($K^+$), magnesium ions ($Mg^{2+}$), aluminum ions ($Al^{3+}$), zinc ions ($Zn^{2+}$), etc., severely distort the structures of conventional $Li^+$ intercalation materials and, consequently, destroy the host structures within several charge/discharge cycles. In light of this, new materials with larger interstitial spaces are required in order to accommodate various metal-ions for a metal-ion battery.

FIG. 1 is a diagram depicting the crystal structure of a transition metal hexacyanoferrate (TMHCF) in the form of $A_xM1M2(CN)_6$ (prior art). Transition metals are defined as elements whose atoms possess an incomplete d sub-shell or can give rise to cations (transition metal ions) with an incomplete d shell and include Groups 3 to 12 of the Periodic Table. The crystal structure of TMHCFs exhibits an open framework and is analogous to that of the $ABX_3$ perovskite, as shown. In general, $M_1$ and $M_2$ are transition metal ions in an ordered arrangement on the B sites. The large, tetrahedrally coordinated A sites can host both alkali and alkaline earth ions ($A_x$) in addition to species such as $H_2O$. The number of alkali (or alkaline earth ions) in the large cages of this crystallographically porous framework may vary from x=0 to x=2 depending on the respective valence(s) of $M_1$ and $M_2$. Conveniently, the open framework structure of the TMHCFs facilitates both rapid and reversible intercalation processes for alkali and alkaline earth ions ($A_x$).

Transition metal hexacyanoferrates (TMHCFs) with large interstitial spaces have been investigated as cathode materials for rechargeable lithium ion batteries,[1,2] sodium-ion batteries,[3,4] and potassium-ion batteries[5] By employing an aqueous electrolyte containing the appropriate alkali-ions or ammonium-ions, copper and nickel hexacyanoferrates [(Cu,Ni)-HCFs] demonstrated a robust cycling life with 83% capacity retention after 40,000 cycles at a charge/discharge current rate of 170C.[6-8] In spite of this, the materials demonstrated low capacities and energy densities due to the facts that (1) only one sodium-ion ($Na^+$) could be inserted/extracted into/from per Cu-HCF or Ni-HCF formula, and (2) the TM-HCFs electrodes were restricted to operation below 1.23 volts (V) due to the electrochemical window for water decomposition. In order to compensate for such shortcomings, manganese hexacyanoferrate (Mn-HCF) and iron hexacyanoferrate (Fe-HCF) were employed as cathode materials in non-aqueous electrolyte systems.[9, 10] When assembled into batteries with sodium-metal anode, Mn-HCF and Fe-HCF electrodes delivered capacities of ~110 mAh/g when cycled between 2.0 and 4.2 V.

It is worth noting that it is extremely difficult to directly obtain $Na_2Fe_2(CN)_6$ through a conventional precipitation method. Typically, upon addition of an $Fe^{2+}$-containing solution into a solution of $Fe(CN)_6^{4-}$, $Fe^{2+}$-ions are immediately oxidized to afford a blue precipitate of $Na_{1-x}Fe_2(CN)_6$. Electrochemical methods have been used to determine that X equals 0.48 for a $Na_{1-x}Fe_2(CN)_6$ sample synthesized in this manner. Furthermore, the small $Na^+$ content confirms that a certain proportion of Fe(II) in $Fe(CN)_6^{4-}$ was similarly oxidized during the process. In 2011, Hu et al. reported a hydrothermal method to synthesize $K_2Fe_2(CN)_6$ from $K_4Fe(CN)_6$ in a neutral pH solution.[11] However, it is difficult to synthesize $Na_2Fe_2(CN)_6$ due to the fact that sodium ions are smaller than potassium ions and are therefore harder to retain in the large interstitial space of Fe-HCF. In addition, the reaction is sensitive to the pH of the reaction solution.[12-14] In acidic solutions (pH<7), $K_4Fe(CN)_6$ produced a Prussian blue material, namely $KFe_2(CN)_6$, using a hydrothermal reaction process. In alkaline solutions (pH>7), $K_4Fe(CN)_6$ decomposed and formed iron (II, III) oxide ($Fe_3O_4$). In light of these results, it may be surmised that the formation of $Na_2Fe_2(CN)_6$ requires specific solution pH unlike the neutral conditions that were found to be satisfactory for synthesizing $K_2Fe_2(CN)_6$. However, the deliberate adjustment of the pH for reaction solutions also failed to produce $Na_2Fe_2(CN)_6$.

It would be advantageous if a process existed that was able to directly synthesize $Na_{1+x}Fe[Fe(CN)_6]$, where X is less than or equal to 1.

[1] V. D. Neff, "Some Performance Characteristics of a Prussian Blue Battery", *Journal of Electrochemical Society* 1985, 132, 1382-1384.

[2] N. Imanishi, T. Morikawa, J. Kondo, Y. Takeda, O. Yamamoto, N. Kinugasa, and T. Yamagishi, "Lithium Intercalation Behavior into Iron Cyanide Complex as Positive Electrode of Lithium Secondary Battery", *Journal of Power Sources* 1999, 79, 215-219.

[3] Y. Lu, L. Wang, J. Cheng, and J. B. Goodenough, "Prussian Blue: a New Framework for Sodium Batteries", *Chemistry Communications* 2012, 48, 6544-6546.

[4] L. Wang, Y. Lu, J. Liu, M. Xu, J. Cheng, D. Zhang, and J. B. Goodenough, "A Superior Low-Cost Cathode for a Na-ion Battery", *Angewandte Chemie International Edition* 2013, 52, 1964-1967.

[5] A. Eftekhari, "Potassium Secondary Cell Based on Prussian Blue Cathode", *Journal of Power Sources* 2004, 126, 221-228.

[6] C. D. Wessells, R. A. Huggins, and Y. Cui, "Copper Hexacyanoferrate Battery Electrodes with Long Cycle Life and High Power", *Nature Communications* 2011, 2, Article number: 550.

[7] C. D. Wessells, S. V. Peddada, R. A. Huggins, and Y. Cui, "Nickel Hexacyanoferrate Nanoparticle Electrodes for Aqueous Sodium and Potassium Ion Batteries", *Nano Letters* 2011, 11, 5421-5425.

[8] C. D. Wessells, S. V. Peddada, M. T. McDowell, R. A. Huggins, and Y. Cui, "The Effect of Insertion Species on Nanostructured Open Framework Hexacyanoferrate Battery Electrodes", *Journal of the Electrochemical Society* 2012, 159, A98-A103.

[9] T. Matsuda, M. Takachi, and Y. Moritomo, "A Sodium Manganese Ferrocyanide Thin Film for Na-ion Batteries", *Chemical Communications* 2013, 49, 2750-2752.

[10] S-H. Yu, M. Shokouhimehr, T. Hyeon, and Y-E. Sung, "Iron Hexacyanoferrate Nanoparticles as Cathode Materials for Lithium and Sodium Rechargeable Batteries", *ECS Electrochemistry Letters* 2013, 2, A39-A41.

[11] M. Hu and J. S. Jiang, "Facile Synthesis of Air-Stable Prussian White Microcubes via a Hydrothermal Method", *Materials Research Bulletin* 2011, 46, 702-707.

[12] S-H. Lee and Y-D. Huh, "Preferential Evolution of Prussian Blue's Morphology from Cube to Hexapod", *The Bulletin of the Korean Chemical Society* 2012, 33, 1078-1080.

[13] M. Hu, Jiang, C-C. Lin, and Y. Zeng, "Prussian Blue Mesocrystals: an Example of Self-Construction", *CrystEngComm* 2010, 12, 2679-2683.

[14] M. Hu, R-P. Ji, and J-S. Jiang, "Hydrothermal Synthesis of Magnetite Crystals: from Sheet to Pseudo-Octahedron", *Materials Research Bulletin* 2010, 45, 1811-1715.

SUMMARY OF THE INVENTION

Described herein is a hydrothermal reaction process for directly synthesizing sodium iron(II)-hexacyanoferrate(II) ($Na_{1+x}Fe[Fe_2(CN)_6]$). According to one aspect of this method, reducing agents and/or anti-oxidants are integrated into the reaction solutions. During the hydrothermal reaction, Fe(II) in the reaction solution is protected from oxidization by the presence of reducing agents/anti-oxidants. Unlike $NaFe_2(CN)_6$, $Na_{1+x}Fe[Fe_2(CN)_6]$ can be directly used as a cathode in sodium-ion batteries with a non-sodium anode to achieve high capacity. Some unique aspects of the process include:

(1) Hydrothermal reaction processes and conditions are employed to synthesize sodium iron(II) hexacyanoferrate [$Na_{1+x}Fe[Fe(CN)_6]$], where X=0 to 1.

(2) Reducing agents or anti-oxidants are included within the hydrothermal reaction solutions to protect iron(II) from oxidization, which allows more sodium-ions to be retained in the Fe-HCF structure.

(3) The reaction solution can be weakly acidic, although it is not necessary.

(4) Without any additional processes, $Na_{1+x}Fe[Fe(CN)_6]$ can be directly employed as a cathode material in sodium-ion batteries with a non-sodium metal anode.

Accordingly, a method is provided for synthesizing sodium iron(II)-hexacyanoferrate(II). The method prepares a first solution including sodium ions, where the sodium ions are derived from a material such as sodium nitrite, sodium nitrate, sodium chloride, sodium carbonate, sodium acetate, sodium phosphate, sodium thiosulfate, sodium iodide, sodium bisulfite, sodium sulfite, sodium bromide, sodium fluoride, or combinations thereof. The first solution may include an aqueous solvent, non-aqueous solvent, or a combination thereof.

A $Fe(CN)_6$ material is mixed with the first solution and either an anti-oxidant or a reducing agent. The $Fe(CN)_6$ material may be either ferrocyanide ($[Fe(CN)_6]^{4-}$) or ferricyanide ($[Fe(CN)_6]^{3-}$). Potential anti-oxidants and reducing agents include monosaccharides, disaccharides, glucose, ascorbic acid, formic acid, alcohols, oxalic acid, aldehydes, ketones, organic compounds having reducing properties, inorganic compounds having reducing properties, or combinations thereof.

As a result, sodium iron(II)-hexacyanoferrate(II) ($Na_{1+X}Fe[Fe(CN)_6]_Z \cdot MH_2O$) is formed, where X are Z are each less than or equal to 1, and where M is in a range between 0 and 7. In one aspect, the first solution including includes A ions, such as alkali metal ions, alkaline earth metal ions, or combinations thereof, resulting in the formation of $Na_{1+X}A_YFe[Fe(CN)_6]_Z \cdot MH_2O$, where Y is less than or equal to 1.

Additional details of the above-described method, a $Na_{1+X}Fe[Fe(CN)_6]_Z$ battery electrode, and $Na_{1+X}Fe[Fe(CN)_6]_Z$ battery are presented below.

BRIEF DESCRIPTION OF THE DRAWINGS

FIG. 10 is a flowchart illustrating method for synthesizing sodium iron(II)-hexacyanoferrate(II).

DETAILED DESCRIPTION

Figure 1:
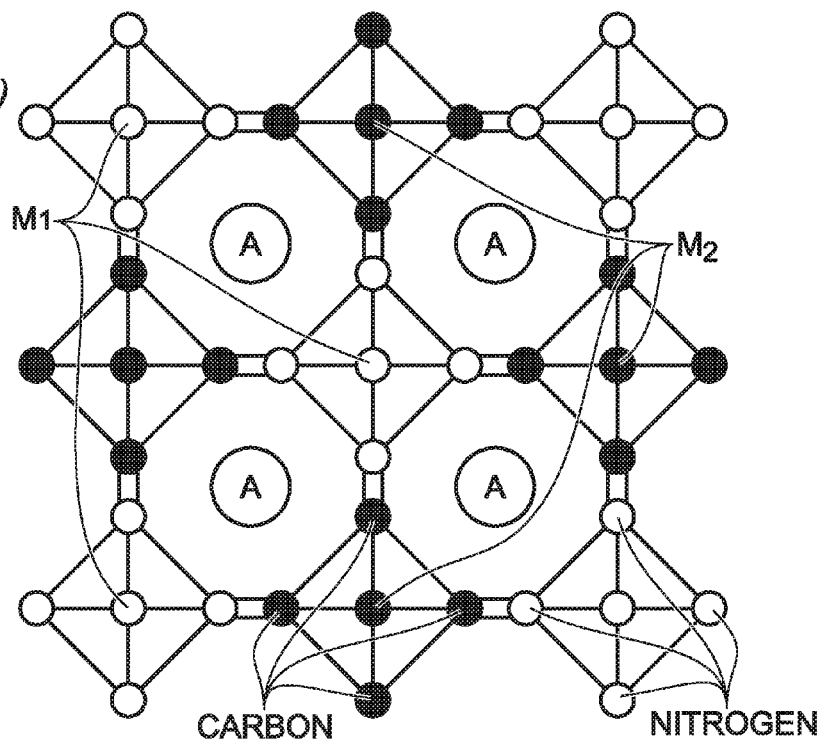
FIG. 1 is a diagram depicting the crystal structure of a transition metal hexacyanoferrate (TMHCF) in the form of $A_xM1M2(CN)_6$ (prior art).
Figure 2:
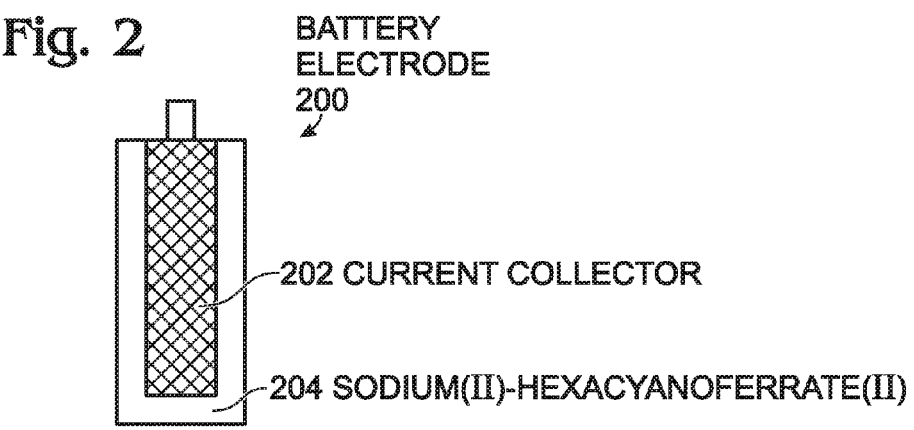
FIG. 2 is a partial cross-sectional view of a sodium iron(II)-hexacyanoferrate(II) battery electrode.

FIG. 2 is a partial cross-sectional view of a sodium iron(II)-hexacyanoferrate(II) battery electrode. The battery electrode 200 comprises a current collector 202 and sodium iron(II)-hexacyanoferrate(II) ($Na_{1+X}Fe[Fe(CN)_6]_Z \cdot MH_2O$) 204 overlying the current collector,
where X and Z are each less than or equal to 1; and,
where M is in a range of 0 to 7.

In one aspect, the sodium iron(II)-hexacyanoferrate(II) 204 additionally comprises A ions such as alkali metal ions, alkaline earth metal ions, or combinations thereof, forming $Na_{1+X}A_YFe[Fe(CN)_6]_Z \cdot MH_2O$, where Y is less than or equal to 1. The A ions may be lithium ions ($Li^+$), sodium ions ($Na^+$), potassium ions ($K^+$), rubidium ions ($Rb^+$), cesium ions ($Cs^+$), beryllium ions ($Be^+$), magnesium ions ($Mg^+$), calcium ions ($Ca^+$), strontium ions ($Sr^+$), or barium ions ($Ba^+$). As used herein, alkali metal refers to elements in Group 1 of the Periodic Table which exhibit a tendency to form ions with a single positive charge (alkali metal ions) through loss of an electron. Alkaline earth metals include those elements in Group 2 of the Periodic Table which readily lose two electrons to form species with a 2+ charge (alkaline earth metal ions).

As would be understood by those with ordinary skill in the art, the battery electrode 200 may also include a conductor (not shown), such as a carbonaceous material including carbon black, carbon nanotubes, carbon fibers, etc., to improve electrical conductivity between the sodium iron(II)-hexacyanoferrate(II) 204, and between the sodium iron(II)-hexacyanoferrate(II) 204 and the current collector 202. The battery electrode 200 may also include a polymer binder (not shown), such as polytetrafluoroethylene (PTFE) or polyvinylidene difluoride (PVDF) to provide adhesion between electrode components/current collector and improve the overall physical stability and form of the battery electrode.

Figure 3A:
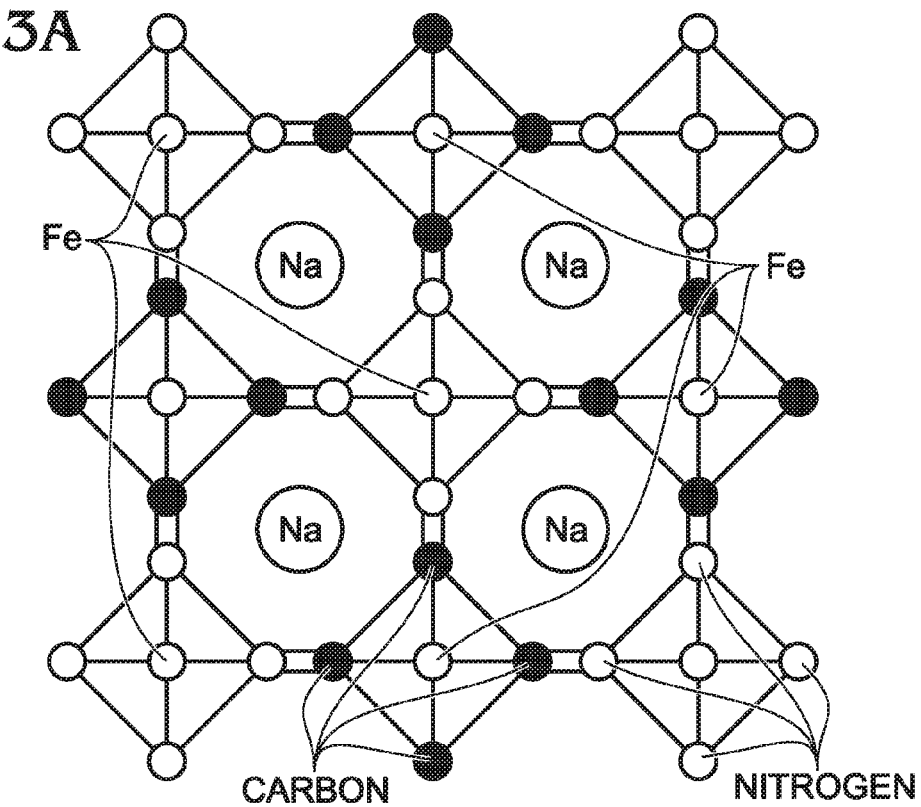
FIGS. 3A and 3B are, respectively, schematic drawings of $Na_{1+X}Fe[Fe(CN)_6]_Z \cdot MH_2O$ and $Na_{1+X}A_YFe[Fe(CN)_6]_Z \cdot MH_2O$.
Figure 3B:
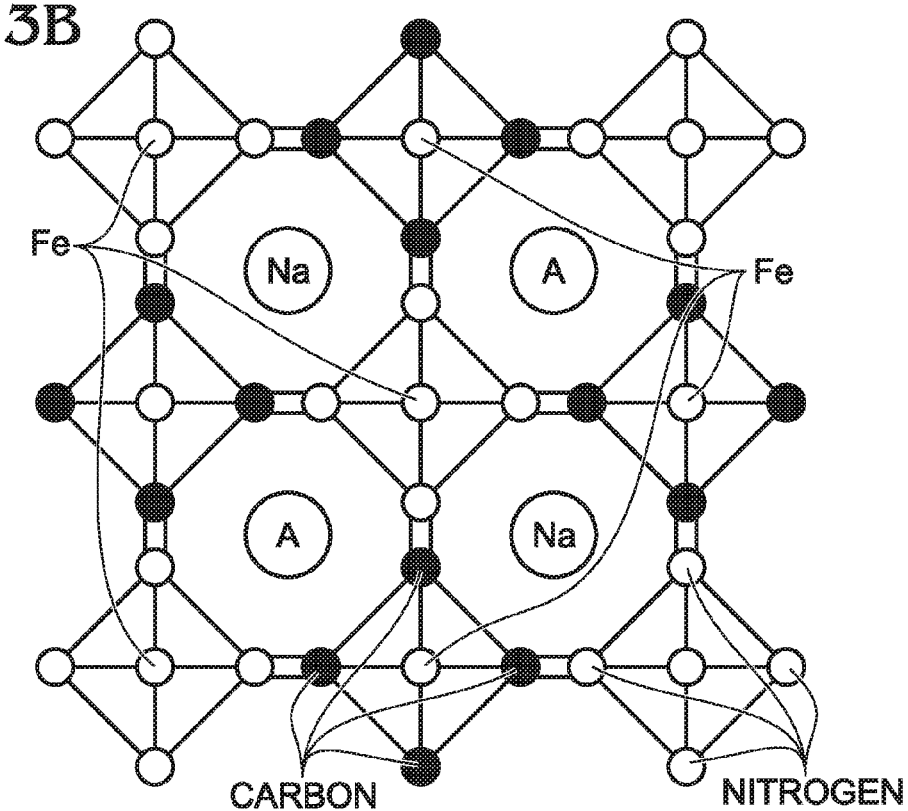

FIGS. 3A and 3B are, respectively, schematic drawings of $Na_{1+X}Fe[Fe(CN)_6]_Z \cdot MH_2O$ and $Na_{1+X}A_YFe[Fe(CN)_6]_Z \cdot MH_2O$.

Figure 4:
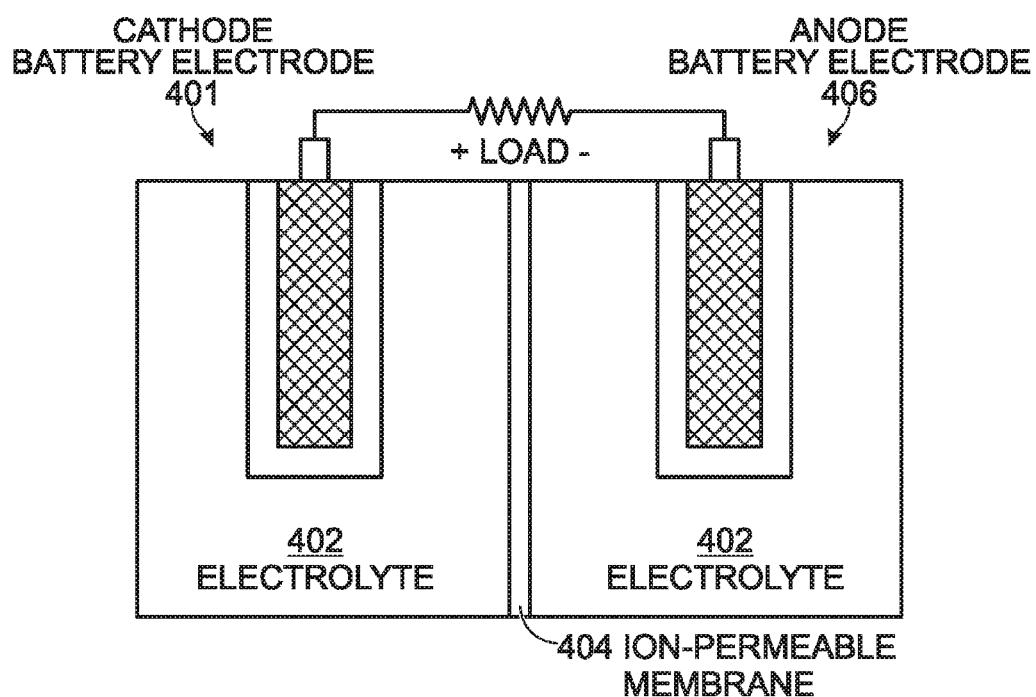
FIG. 4 is a partial cross-sectional view of a battery employing the battery electrode of FIG. 2.

FIG. 4 is a partial cross-sectional view of a battery employing the battery electrode of FIG. 2. The battery 400 comprises a cathode (positive) battery electrode 401, an electrolyte 402, and an anode (negative) battery electrode 406. Either the cathode battery electrode 401 or the anode battery electrode 406 is made from sodium iron(II)-hexacyanoferrate(II) overlying a current collector, as described above in the explanation of FIG. 2. For example, the cathode 401 can be made from a sodium iron(II)hexacyanoferrate(II) material while the anode 406 is made with a TMHCF material other than sodium iron(II)-hexacyanoferrate(II). The designation of an electrode as an anode or a cathode is arbitrary, based upon the relative potentials of the two TMHCF materials. The electrolyte 402 may be non-aqueous, such as an organic liquid electrolyte, or alternatively, gel electrolyte, polymer electrolyte, solid (inorganic) electrolyte, etc. Common examples of non-aqueous (liquid) electrolytes include organic carbonates such as ethylene carbonate (EC), propylene carbonate (PC), diethyl carbonate (DEC), etc., although many other organic carbonates and alternatives to organic carbonates exist. Typically, gel electrolytes consist of polymeric materials which have been swelled in the presence of liquid electrolytes. Examples of polymers employed as gel electrolytes include, but are not limited to, poly(ethylene)oxide (PEO) and fluorinated polymers such as poly(vinylidene) fluoride (PVDF)-based polymers and copolymers, etc. In contrast, (solid) polymer electrolytes may be prepared using the same classes of polymers for forming gel electrolytes although swelling of the polymer in liquid electrolytes is excluded. Finally, solid inorganic (or ceramic) materials may be considered as electrolytes, which may be employed in combination with liquid electrolytes. Overall, the appropriate electrolyte system may consist of combinations (hybrid) of the above classes of materials in a variety of configurations. Otherwise, an aqueous electrolyte compatible with the sodium iron(II)-hexacyanoferrate(II) may be used. An ion-permeable membrane 404 is interposed between the cathode 200a and the anode 200b. In some instances not shown, the ion-permeable membrane and the electrolyte can be the same material, as may be the case for polymer gel, polymer, and solid electrolytes.

In another aspect, if the cathode battery electrode 401 is made from sodium iron(II)-hexacyanoferrate(II), as described above, the anode battery electrode 406 may be made from a sodium metal, a metal (other than sodium), metal alloy, non-metal material, and/or a polymer material.

The electrodes described above are the result of an improved hydrothermal reaction strategy to synthesize sodium iron(II)-hexacyanoferrate ($Na_{1+x}Fe[Fe(CN)_6]_Z$). In general, metal hexacyanoferrates can be synthesized in a straightforward method using a standard precipitation method. Briefly, a solution containing metal-ions is dropped (added) into a ferrocyanide/ferricyanide solution to afford the metal hexacyanometallate material. Conventionally, the precipitation method is not readily applicable to the preparation of Fe(II) hexacyanoferrate (II) (Fe-HCF) synthesis since Fe(II) is readily oxidized in the solution even under inert (nitrogen) atmosphere.

Figure 5:
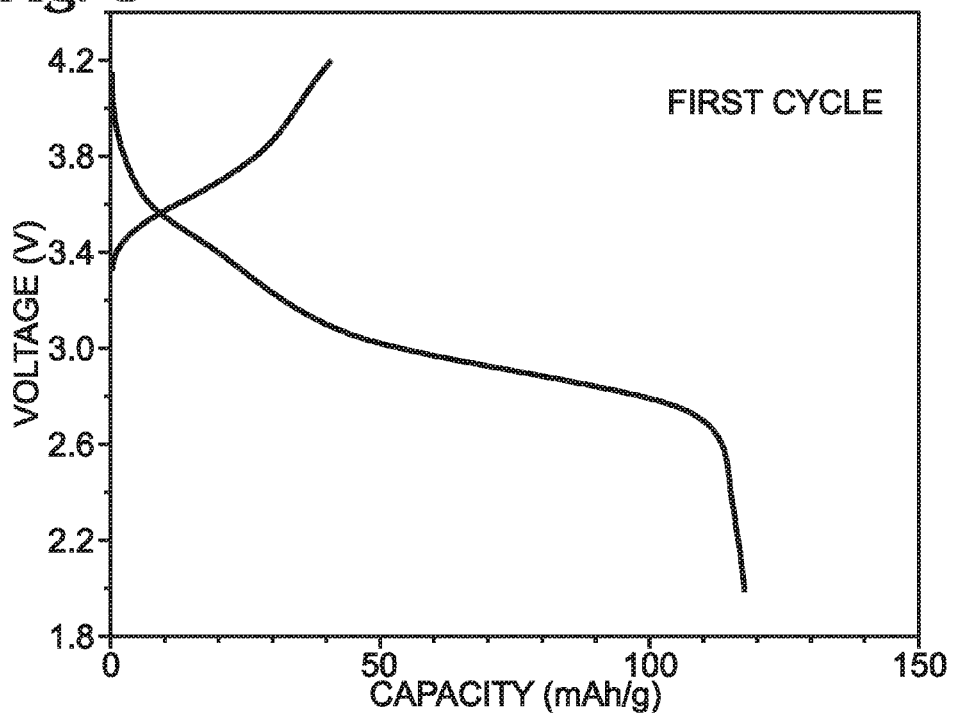
FIG. 5 is a graph representing the electrochemical behavior of $Na_{1+X}Fe[Fe(CN)_6]_Z$ synthesized by a conventional precipitation method that mixes a $Fe^{2+}$ solution and a ferrocyanide solution.

FIG. 5 is a graph representing the electrochemical behavior of $Na_{1+x}Fe[Fe_2(CN)_6]_Z$ synthesized by a conventional precipitation method that mixes a $Fe^{2+}$ solution and a ferrocyanide solution. During the first charge, the material demonstrated a capacity of 40.85 mAh/g, which corresponds to 0.52 $Na^+$-ions per formula. Furthermore, thermogravimetric analysis (TGA) analysis confirmed the presence of 2.79 water molecules per formula. Thus, the molecular formula can be calculated to be $Na_{0.52}Fe^{III}[Fe^{II}(CN)_6]_{1-y}\cdot2.79H_2O$ (y<1). As a result, it is evident that $Na_{1+x}Fe[Fe_2(CN)_6]$ cannot be synthesized using the conventional precipitation method.

Figure 6:
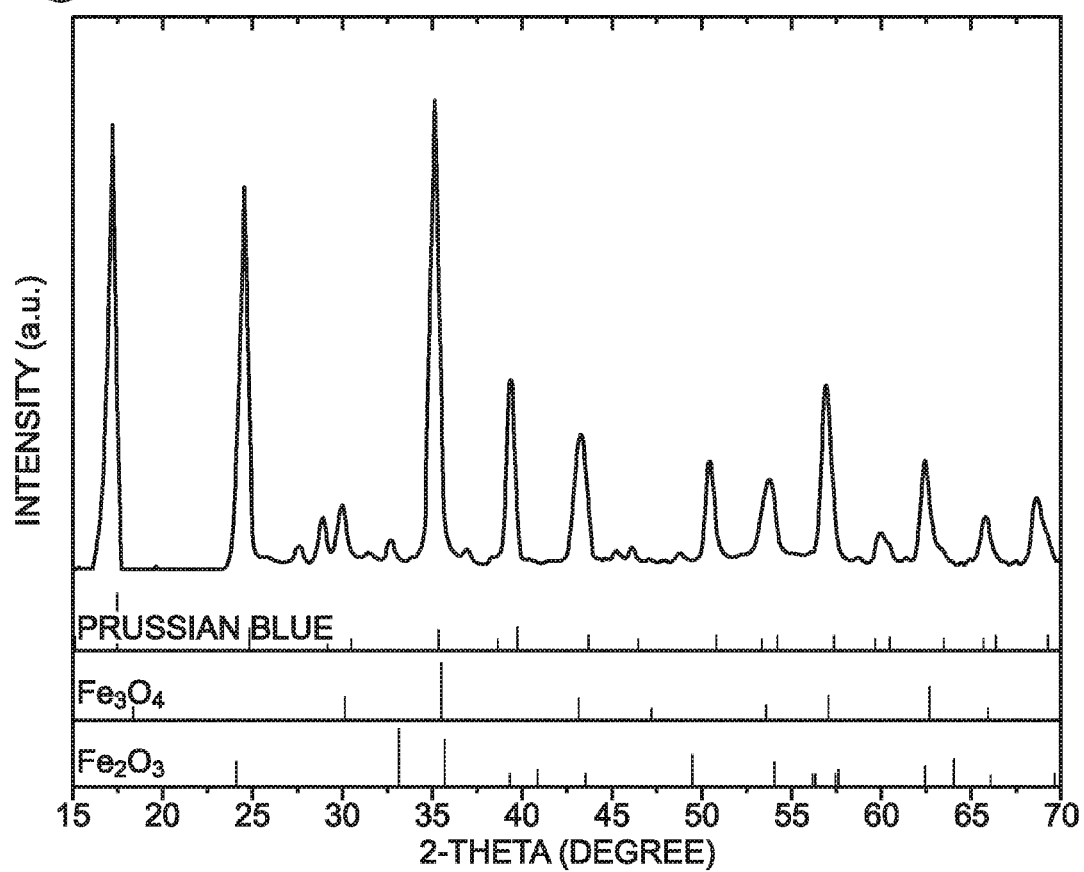
FIG. 6 is an x-ray diffraction (XRD) pattern of a $NaFe_2(CN)_6$ prepared using a method purportedly able to produce $K_2Fe_2(CN)_6$.

FIG. 6 is an x-ray diffraction (XRD) pattern of a $NaFe_2(CN)_6$ sample prepared using a method purportedly able to produce $K_2Fe_2(CN)_6$. At the time of this filing, only one technical paper has been found which described the synthesis of a stable potassium Fe(II)-HCF(II) ($K_2Fe_2(CN)_6$) using the hydrothermal reaction.[11] Experiments were performed with strict adherence to the reported methods in attempts to synthesize sodium Fe(II)-HCF(II) ($Na_2Fe_2(CN)_6$). However, no white-colored product consistent with $Na_2Fe_2(CN)_6$ was obtained from the process. In fact, the product was determined to be a mixture of $NaFe_2(CN)_6$, $Fe_3O_4$, and iron(III) oxide ($Fe_2O_3$), although all peaks of $Fe_2O_3$ exhibited a small displacement to the low angles. Some displacement is normal in XRD experiments, due to instrument accuracy and calibration, sample surface irregularities, and changes in the size of the crystal under examination. As contrast to the XRD pattern of the synthesized $NaFe_2(CN)_6$ sample (top), showing peaks and peak locations, the standard (known) peak locations for $Fe_2O_4$ (middle) and $Fe_2O_3$ (bottom) are shown.

Additional experiments were also performed during which the pH of the reaction solution was deliberately adjusted to slightly acidic (pH<7), while oxygen was removed from the reaction solution by purging with nitrogen, with the expectation that Prussian white [$Na_2Fe_2(CN)_6$] could be synthesized under these conditions. Despite pH values of less than 5, it was observed that as the pH decreased, the corresponding colors of the reaction products transitioned from red ($Fe_2O_3$) to dark blue (Prussian blue). However, no white-colored product consistent with the formation of $Na_2Fe_2(CN)_6$ was observed.

The above results clearly demonstrate the fact that Fe(II)-ions were oxidized during the reaction regardless of solution pH. In response to this, an improved hydrothermal reaction was developed, as disclosed herein, to synthesize sodium Fe(II)-HCF(II) by introducing reducing agents or anti-oxidants to the reaction medium. During the hydrothermal reaction, these agents provide a reducing environment to protect Fe(II) from oxidization.

Figure 7:
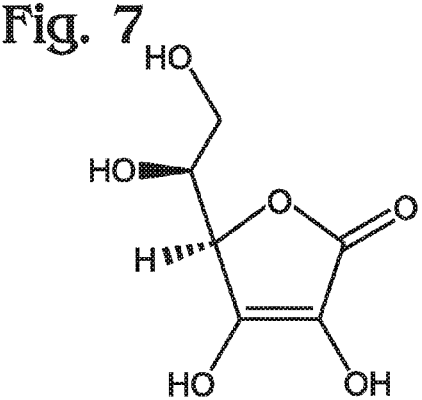
FIG. 7 is a schematic diagram depicting the structure of ascorbic acid, which is a common anti-oxidant.

FIG. 7 is a schematic diagram depicting the structure of ascorbic acid, which is a common anti-oxidant. In one experiment, ascorbic acid was added into the hydrothermal reaction solution. From a mechanistic perspective, ascorbic acid ions react with oxygen radicals ($O^\bullet$) to effectively remove oxidizing species from the reaction solution according to the following:

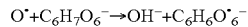

Figure 8:
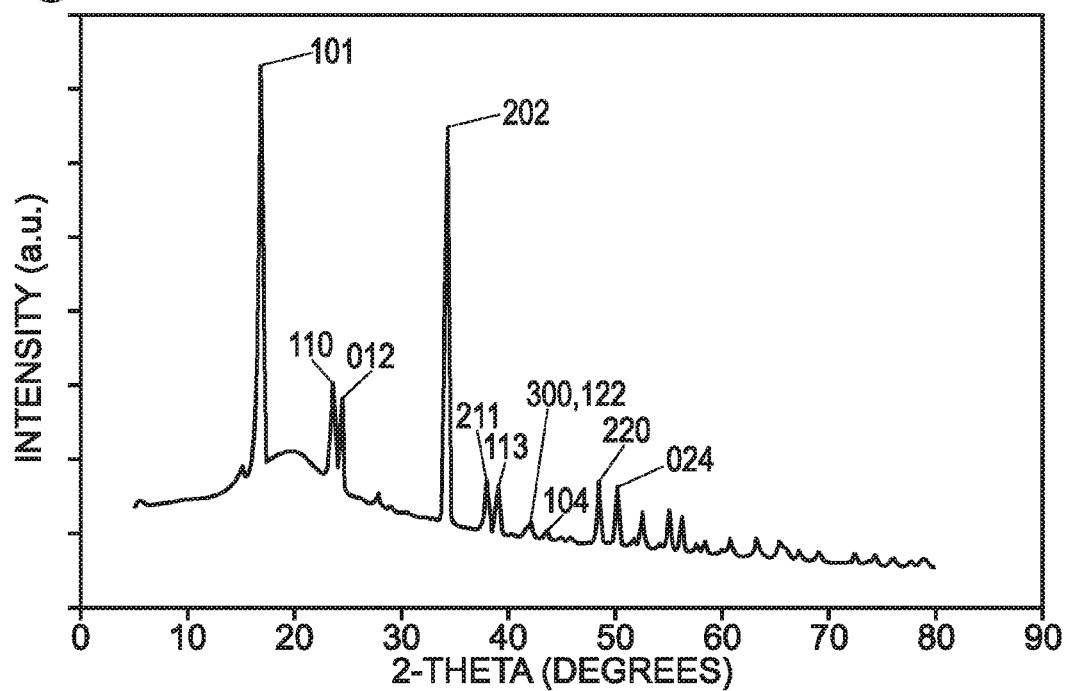
FIG. 8 is a XRD pattern for $Na_{1+X}Fe[Fe(CN)_6]_Z$ synthesized using a hydrothermal process including ascorbic acid in the reaction solution.

FIG. 8 is a XRD pattern for sodium Fe(II)-HCF(II) synthesized using a hydrothermal process including ascorbic acid in the reaction solution. Accordingly, Fe(II) was protected from oxidation and sodium Fe(II)-HCF(II) was formed. Unlike $NaFe_2(CN)_6$, with a cubic structure, sodium Fe(II)-CHF(II) exhibits a rhombohedral structure. The presence of additional sodium-ions in the framework introduces a rhombohedral site symmetry along each of the four [1 1 1] axes that stabilize the sodium-ion displacement along a cubic [1 1 1] axis toward a more negative octahedral-site complex. This rhombohedral structure is also different from potassium Fe(II)-HCF(II) reported by Hu, et al. wherein the $K_2Fe_2(CN)_6$ exhibited a monoclinic structure.[11]

Figure 9:
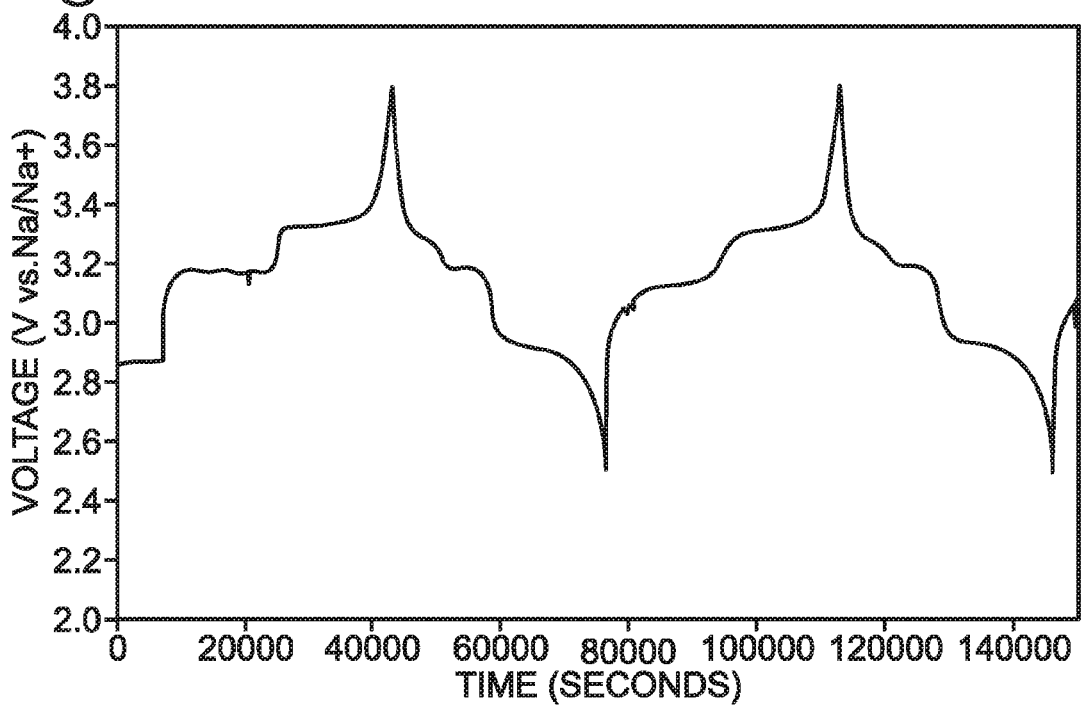
FIG. 9 is a graph depicting the charge/discharge curves for batteries using $Na_{1+X}Fe[Fe(CN)_6]_Z$ material synthesized using a hydrothermal process including ascorbic acid in the reaction solution.

FIG. 9 is a graph depicting the charge/discharge curves for batteries using $Na_{1+x}Fe[Fe(CN)_6]_Z$ material synthesized using a hydrothermal process including ascorbic acid in the reaction solution. Based upon a first charge capacity of 135 mAh/g, the number of sodium could be calculated to be ~1.6 per formula. In other words, the formula of sodium Fe(II)-HCF(II) could be designated as $Na_{1.6}Fe[Fe(CN)_6]\cdot mH_2O$. These results unambiguously demonstrate that sodium Fe(II)-HCF(II) can be readily synthesized via the modified hydrothermal reaction wherein reducing agents and anti-oxidants assume a critical role in protecting Fe(II) from oxidization during the process. Unlike $NaFe_2(CN)_6$, $Na_{1+x}Fe[Fe(CN)_6]_Z\cdot mH_2O$ with a high $Na^+$ content can be directly employed as cathode materials in sodium-ion batteries using a non-sodium metal anode.

FIG. 10 is a flowchart illustrating method for synthesizing sodium iron(II)-hexacyanoferrate(II). Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 1000.

Step 1002 prepares a first solution including sodium ions. The sodium ions may be derived from materials such as sodium nitrite, sodium nitrate, sodium chloride, sodium carbonate, sodium acetate, sodium phosphate, sodium thiosulfate, sodium iodide, sodium bisulfite, sodium sulfite, sodium bromide, sodium fluoride, or combinations thereof. Step 1004 mixes a $Fe(CN)_6$ material with the first solution and a first element, which is either an anti-oxidant or a reducing agent. The $Fe(CN)_6$ material may be either ferrocyanide ($[Fe(CN)_6]^{4-}$) or ferricyanide ($[Fe(CN)_6]^{3-}$). As used herein, an antioxidant is defined as a material that inhibits oxidation. Anti-oxidants function to remove free radical intermediates generated during oxidation processes as well as inhibit other oxidation reactions. A reducing agent is defined as a species that donates an electron to another species in an oxidation-reduction (redox) reaction. Consequently, the reducing agent is itself oxidized in the process since electron(s) have been forfeited. Overall, there exist a number of agents that can function as anti-oxidants and/or reducing agents including monosaccharides (glucose, glyceraldehyde, galactose), disaccharides (lactose, maltose), starch, ascorbic acid, formic acid, alcohols, oxalic acid, aldehydes, ketones, organic compounds having reducing properties, and inorganic compounds having reducing properties. In general, reducing sugars (reducing mono- and di-saccharides) are characterized by "open-chain" forms containing an aldehyde group or, alternatively, containing a ketone group that can provide an aldehyde group via isomerization. The aldehyde group of the reducing sugar can be oxidized via a redox reaction through which a separate material is reduced in the process. Starches are glucose polymers that may contain an abundance of aldehyde groups. Ascorbic acid is a naturally occurring anti-oxidant that represents a form of Vitamin C. Since formic acid in a deprotonated form breaks into hydride and carbon dioxide, it can function as a reducing agent. Considering the fact that alcohols are sensitive to oxidation to yield aldehydes, ketones and/or carboxylic acids depending upon the nature of the alcohol and/or reaction conditions, they can be viewed as behaving as reducing agents. Oxalic acid can function as a reducing agent by donating electrons during which process it is transformed (oxidized) to carbon dioxide.

Step 1006 forms sodium iron(II)-hexacyanoferrate(II) ($Na_{1+X}Fe[Fe(CN)_6]_Z \cdot MH_2O$), where X and Z are each less than or equal to 1; and, where M is in a range between 0 and 7.

In one aspect, preparing the first solution in Step 1002 includes the first solution comprising a solvent such as an aqueous solvent, non-aqueous solvent, or combinations thereof. In another aspect, mixing the $Fe(CN)_6$ material with the first solution and the first element in Step 1004 includes heating at a temperature in a range between about 20 and 1000° C., forming an intermediate product. The mixing of the $Fe(CN)_6$ material with the first solution and the first element may occur for a duration in the range of 1 hour to 1 month. Further, the mixing may performed by stirring, agitating, or shaking.

In one variation, subsequent to forming the intermediate product, Step 1005a washes the intermediate product in a solution such as an aqueous solution, non-aqueous solution, or combinations thereof. Step 1005b dries the intermediate product at a temperature in a range between about 20 and 200° C. In one aspect, Step 1005b dries the intermediate product under vacuum at a pressure in a range between 0.001 mTorr and 30 Torr. In one aspect, the separation of the intermediate product from the wash solution prior to drying may be performed using a number of conventional processes including, but not limited to, filtration and centrifugation.

In another aspect, preparing the first solution in Step 1002 includes the first solution comprising A ions such as alkali metal ions, alkaline earth metal ions, or combinations thereof. As a result, Step 1006 forms $Na_{1+X}A_YFe[Fe(CN)_6]_Z \cdot MH_2O$, where Y is less than or equal to 1. The A ions may be lithium ions ($Li^+$), sodium ions ($N^+$), potassium ions ($K^+$), rubidium ions ($Rb^+$), cesium ions ($Cs^+$), beryllium ions ($Be^+$), magnesium ions ($Mg^+$), calcium ions ($Ca^+$), strontium ions ($Sr^+$), or barium ions ($Ba^+$).

A $Na_{1+X}Fe[Fe(CN)_6]$ battery electrode and associated synthesis processes have been provided. Examples of particular materials and process steps have been presented to illustrate the invention. However, the invention is not limited to merely these examples. Other variations and embodiments of the invention will occur to those skilled in the art.

We claim:

1. A sodium iron(II)-hexacyanoferrate(II) battery electrode, the battery electrode comprising:
    a current collector;
    sodium iron(II)-hexacyanoferrate(II) ($Na_{1+X}Fe[Fe(CN)_6]_Z \cdot MH_2O$) overlying the current collector,
    where X and Z are each less than or equal to 1; and,
    where M is in a range of 0 to 7.

2. The battery electrode of claim 1 wherein the sodium iron(II)-hexacyanoferrate(II) additionally comprises A ions selected from the group consisting of alkali metal ions, alkaline earth metal ions, and combinations thereof, forming $Na_{1+X}A_YFe[Fe(CN)_6]_Z \cdot MH_2O$, where Y is less than or equal to 1.

3. The battery electrode of claim 2 wherein the A ions are selected from the group consisting of lithium ions ($Li^+$), sodium ions ($Na^+$), potassium ions ($K^+$), rubidium ions ($Rb^+$), cesium ions ($Cs^+$), beryllium ions ($Be^+$), magnesium ions ($Mg^+$), calcium ions ($Ca^+$), strontium ions ($Sr^+$), and barium ions ($Ba^+$).

4. A sodium iron(II)-hexacyanoferrate(II) battery comprising:
    a cathode comprising:
        a current collector;
        sodium iron(II)-hexacyanoferrate(II) ($Na_{1+X}Fe[Fe(CN)_6]_Z \cdot MH_2O$) overlying the current collector,
        where X AND Z are each less than or equal to 1;
        where M is in a range of 0 to 7;
    an anode;
    an electrolyte; and,
    an ion-premeable membrane.

5. The battery of claim 4 wherein the sodium iron(II)-hexacyanoferrate(II) additionally comprises A ions selected from the group consisting of alkali metal ions, alkaline earth metal ions, and combinations thereof, forming $Na_{1+X}A_YFe[Fe(CN)_6]_Z \cdot MH_2O$, where Y is less than or equal to 1.

6. The battery of claim 5 wherein the A ions are selected from the group consisting of lithium ions ($Li^+$), sodium ions ($Na^+$), potassium ions ($K^+$), rubidium ions ($Rb^+$), cesium ions ($Cs^+$), beryllium ions ($Be^+$), magnesium ions ($Mg^+$), calcium ions ($Ca^+$), strontium ions ($Sr^+$), and barium ions ($Ba^+$).

* * * * *